US005874815A

United States Patent [19]

Griessbach

[11] Patent Number: 5,874,815

[45] Date of Patent: Feb. 23, 1999

[54] CONTROL ARRANGEMENT FOR THE FUNCTION STATES OF A LOCK OF MOTOR VEHICLES

[75] Inventor: Robert Griessbach, Hoehenkirchen-Siegertsbrunn, Germany

[73] Assignee: Bayerische Motoren Werke Aktiengesellschaft, Munich, Germany

[21] Appl. No.: 853,825

[22] Filed: May 9, 1997

[30] Foreign Application Priority Data

May 11, 1996 [DE] Germany ........................ 196 19 128.9

[51] Int. Cl.[6] ........................................................ H02P 1/00

[52] U.S. Cl. ............................ 318/283; 318/280; 70/264

[58] Field of Search ........................... 318/10, 16, 34–89, 318/280–293, 443–466; 70/264, 279, 275, 263, 283; 292/201, 336.3; 307/10.1, 10.2

[56] References Cited

U.S. PATENT DOCUMENTS 5,240,296 8/1993 Kobayashi .

FOREIGN PATENT DOCUMENTS 44 30 432 3/1976 Germany .
39 41 086 6/1991 Germany .
42 23 341 11/1993 Germany .
42 26 304 2/1994 Germany .
43 43 340 7/1994 Germany .
44 12 028 10/1995 Germany .
195 23 818 1/1996 Germany .
195 00 509 2/1996 Germany .
195 03 484 2/1996 Germany .
44 39 479 5/1996 Germany .
WO 95/24534 9/1995 WIPO .

*Primary Examiner*—Paul Ip
*Attorney, Agent, or Firm*—Evenson, McKeown, Edwards & Lenahan, P.L.L.C.

[57] ABSTRACT

The control arrangement for functional states of a lock for vehicles has a driving motor for a control element which is variably adjustable corresponding to the functional states. The control element interacts with two levers or cams which are connected with the inside and outside door handle. The control element carries out a uniform circular or linear movement. The control element is adjustable in a number of positions which are equal to the functional states. In these positions, the control element blocks or releases the movements of the levers.

14 Claims, 1 Drawing Sheet

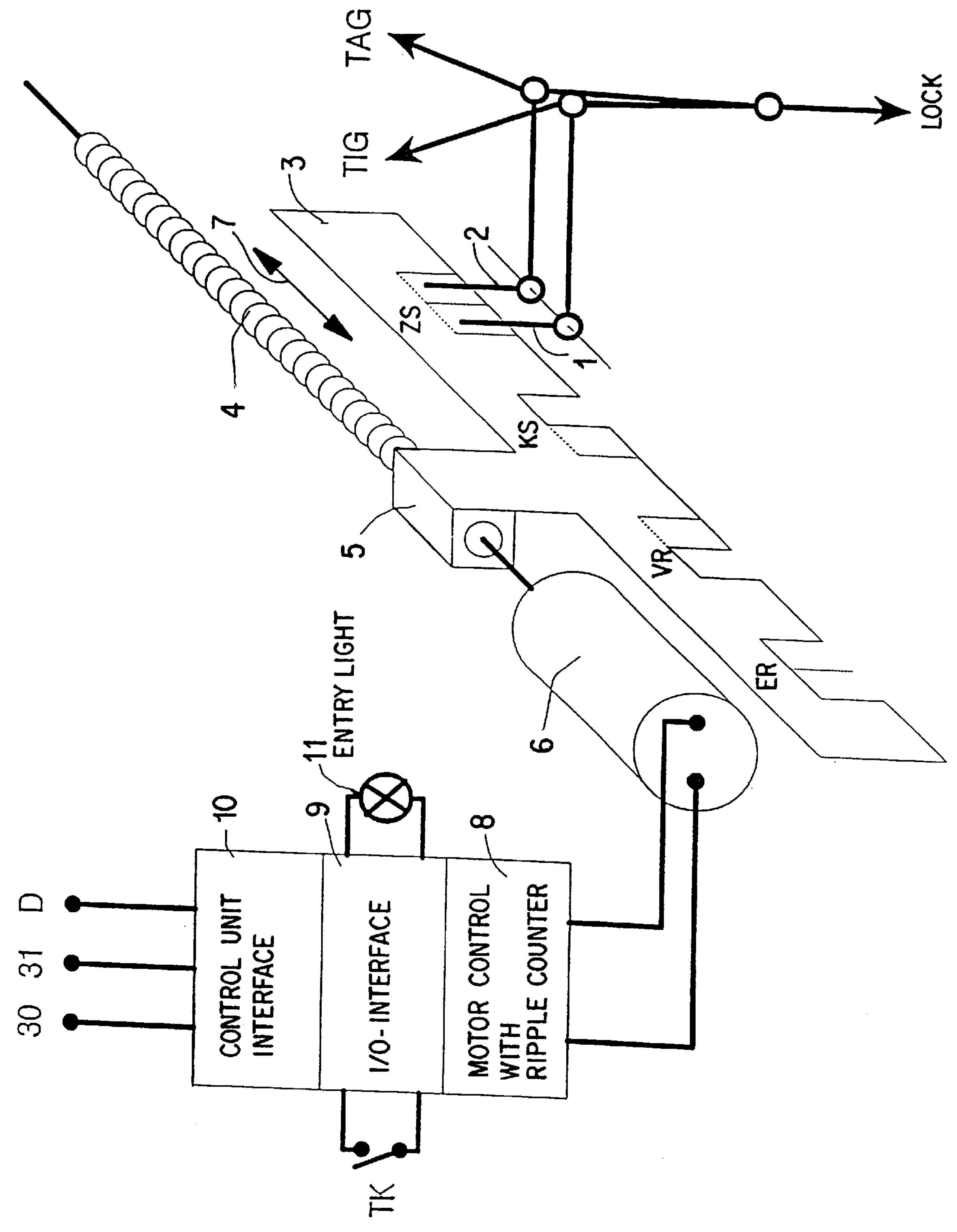
TAG
TIG
LOCK
3
2
7
ZS
1
4
KS
5
VR
ER
6
11
ENTRY LIGHT
10
9
8
CONTROL UNIT
INTERFACE
I/O-INTERFACE
MOTOR CONTROL
WITH
RIPPLE COUNTER
30
31
D
TK

CONTROL ARRANGEMENT FOR THE FUNCTION STATES OF A LOCK OF MOTOR VEHICLES

BACKGROUND AND SUMMARY OF THE INVENTION

This application claims the priority of German Application No. 196 19 128.9 filed on May 11, 1996, the disclosure of which is expressly incorporated by reference herein.

The invention relates to a control arrangement and, more particularly, to a control arrangement for the function states of a vehicle lock having a driving motor for a control element. The control element is variably adjustable corresponding to the function states, and interacts with two levers or cams which are connected with the inside and outside door handle of the vehicle.

In the case of a control arrangement of this type, the control element for four functional states of the lock can be adjusted by a rotational movement into two positions which differ from one another by 180°. In addition, the selected functional state depends on the history of the two levers; that is, their position which existed before the movement of the control element (compare German Patent document DE 43 43 340 A1).

It can easily be recognized that such a control arrangement requires high mechanical expenditures and additional, preferably mechanical, devices which hold the levers in the adjusted position. These devices stand in the way of the goal of a smoothly operating control arrangement which, by means of low mechanical expenditures, permits a change of the adjusted functional state.

There is therefore needed a control arrangement of the above-mentioned type which is distinguished by having low mechanical costs and a smooth drive.

These needs are achieved according to the present invention by a control arrangement for the function states of a vehicle lock having a driving motor for a control element. The control element is variably adjustable corresponding to the function states, and interacts with two levers or cams which are connected with the inside and outside door handle of the vehicle. The control element carries out a uniform circular or linear movement and can be adjusted in a number of positions which are equal to the function states. The control element blocks or releases the movements of the levers in these positions.

As a result of the 1:1 assignment of functional states and positions of the control element, the mechanical expenditures will be considerably reduced in comparison to the known arrangement. It will now not be necessary to take into account the present or preceding position of the two levers. If, as known per se, a rotating movement of the control element is carried out, its positions for the various functional states differ, for example, by a quarter circle. In the case of a linear movement, the functional states can be set by positions of the control element which are situated on the path of the control element in a grid-type manner. Since only the position of the control element is important, the functional states can also be carried out such that the movement of the levers is blocked or released corresponding to the selected function.

If, for example, four functional states are selected, such as the states "unlocked", "locked", "child-secured" and "centrally secured", the respective positions of the control element can be arranged behind one another in the indicated sequence of the functional states. However, as a function of the construction of the lock, it is also possible to implement the functional states or the positions of the control element in a manner which deviates from the indicated pattern. This results in a special freedom for the design of the lock, of the provided locking parts, of the levers and of the control element. In contrast to conventional locks, this results in a considerable savings of components while the fail safe feature is increased and the manufacturing costs and the required space are reduced.

The possibility of controlling the control element by means of the driving motor without any acknowledgment of the actual position of the control element allows for additional simplifications of the constructive expenditures to be obtained. It will then no longer be necessary to detect the actual position of the control element and to control the adjustment of the control element. On the contrary, the supply of corresponding control commands for the driving motor will be sufficient.

This driving motor may be a step motor or, particularly advantageously, a direct-current motor (DC motor). In the case of the DC motor, preferably devices for sensing the rotor position and/or the rotational speed can be provided. For a direct-current motor, such devices are known, for example, from U.S. Pat. No. 4,338,552 or German Patent document DE 42 11 982 A1, the specifications of which are incorporated by reference herein. In this case, a signal on the current supply line is utilized. The signal fluctuates proportionally to the rotations of the rotor in order to obtain information concerning the rotational movement and the rotating position of the rotor and thus of the control element driven by it. When the control element carries out a rotating movement, the driving motor can have only one rotating direction. The different rotating positions can be controlled successively always in the same sequence. However, in the case of a rotating movement and, particularly, in the case of a linear movement of the control element, it is advantageous to provide the driving motor with a reversible rotating direction. The respective functional states can then be set within the shortest possible time period.

For reducing the circuit-related expenditures, the control command for the driving motor can be given as a data message. By means of the corresponding conversion of the data message, unauthorized control of the driving motor can be prevented. The driving motor is activated only when the data message has, in fact, the required format.

Other objects, advantages and novel features of the present invention will become apparent from the following detailed description of the invention when considered in conjunction with the accompanying drawings.

BRIEF DESCRIPTION OF THE DRAWING

The single FIGURE shows a control arrangement according to the invention in its basic construction.

DETAILED DESCRIPTION OF THE DRAWING

Referring to the FIGURE, a door lock of a vehicle, which is not shown in detail, can be operated by an inside door handle TIG and an outside door handle TAG (neither is shown in a practical form). The symbols TIG and TAG with the pertaining action arrows schematically show the operating possibilities and the pertaining grip parts.

One lever 1 or 2 respectively, is connected with the two grip parts TIG, TAG. These levers 1, 2 are also shown schematically with respect to their arrangement and their operating connection to the two grip parts The two levers 1 and 2 interact with a control element 3 which is linearly movable by way of a driving spindle 4. The spindle 4 engages in a spindle nut 5 and is reversibly driven by a driving motor 6. Corresponding to the rotating movement of the spindle 4, the spindle nut 5 and therefore the control element 3 are moved linearly in the direction of the double arrow 7.

The driving motor 6 is provided, as the result of a schematically shown motor control 8, with devices for sensing the rotor position and/or the rotational speed (ripple counter). The devices convert, by way of an input/output interface 9 and an interface 10, arriving data messages to control commands which arrive by way of a data line D. Reference numbers 30 and 31 indicate the voltage supply 30 and the ground connection 31 of the control unit 8 to 10. Within the scope of the present invention but essentially without any importance, a door contact switch TK and an entry light 11 illuminating the entry area of the door are also shown. The light 11 is controlled by the data message.

The control element 3 has four settings in which the four possible functional states of the door lock are in effect. In the position shown in the figure, the two levers 1 and 2 are locked (ZS). This position corresponds to the functional state "lock centrally".

Then, by means of a linear movement of the control element 3 (to the right in the figure), a function state is first set during which the lever 2 is released while the lever 1 continues to be blocked (KS). As a result, it is possible to operate the door lock by means of the outside door handle TAG; while the inside door handle TIG continues to be blocked. This is therefore the functional state "child-secured" KS.

Next, the control element 3 can be further adjusted into a position in which the lever 2 is blocked, while the lever 1 is released (VR). It is therefore possible to operate the door lock by means of the inside door handle TIG. This is therefore the functional state "locked " VR in which it is possible to operate the door lock by means of the inside door handle TIG but not by means of the outside door handle TAG.

Finally, the control element 3 can be brought into a position in which the two levers 1 and 2 are released (ER). The door lock can be operated by means of the inside door handle and the outside door handle. The functional state "unlocked" ER will then exist.

The different operating possibilities of the door lock and the interaction of the control element 3 by way of the levers 1 and 2 with the two grips parts TIG, TAG are shown in the drawing by the design of the control element 3 in the position sections which, in the respective functional state, interact with the levers 1 and 2.

This results in a control arrangement which permits in a very simple manner for the adjusting of up to four functional states by the interaction of a control element 3 driven by an electric motor 6 and the two grip parts to be operated from the inside or from the outside.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for controlling functional states of a vehicle lock, comprising:

a control states element which is variably adjustable into corresponding functional control states of the vehicle lock;

two levers or cams respectively connected with an inside and an outside door handle, said control states element interacting with said two levers or cams;

a driving motor coupled to the control element; and wherein the control states element performs one of a circular and linear movement and is adjusted in a number of positions which is equal to the functional control states; and wherein said control states element blocks or releases movements of said two levers in the functional positions.

2. An arrangement according to claim 1, wherein the control element is controlled by the driving motor without an acknowledgment of the control element's actual position.

3. An arrangement according to claim 2, wherein the driving motor is a direct-current motor, said motor further including devices for sensing a rotor position and/or a rotational speed.

4. An arrangement according to claim 2, wherein the driving motor is reversible.

5. An arrangement according to claim 3, wherein the driving motor is reversible.

6. An arrangement according to claim 1, wherein a control command for the driving motor is supplied as a data message.

7. An arrangement according to claim 2, wherein a control command for the driving motor is supplied as a data message.

8. An arrangement according to claim 3, wherein a control command for the driving motor is supplied as a data message.

9. An arrangement according to claim 4, wherein a control command for the driving motor is supplied as a data message.

10. An arrangement according to claim 1, further comprising a spindle drive which connects the driving motor and the control element with one another.

11. An arrangement according to claim 2, further comprising a spindle drive which connects the driving motor and the control element with one another.

12. An arrangement according to claim 3, further comprising a spindle drive which connects the driving motor and the control element with one another.

13. An arrangement according to claim 4, further comprising a spindle drive which connects the driving motor and the control element with one another.

14. An arrangement according to claim 6, further comprising a spindle drive which connects the driving motor and the control element with one another.

* * * * *